Jan. 31, 1933.　　　F. C. GRANT　　　1,895,986
PEDAL PAD
Filed Oct. 12, 1931
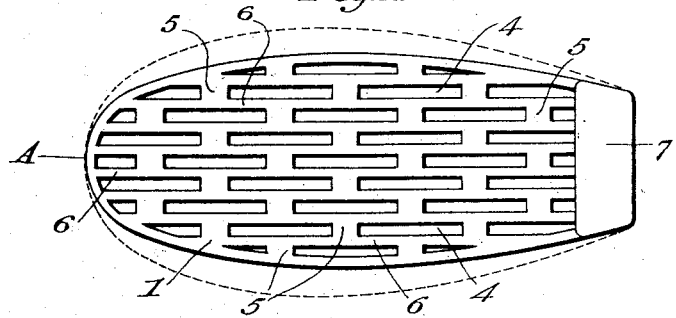
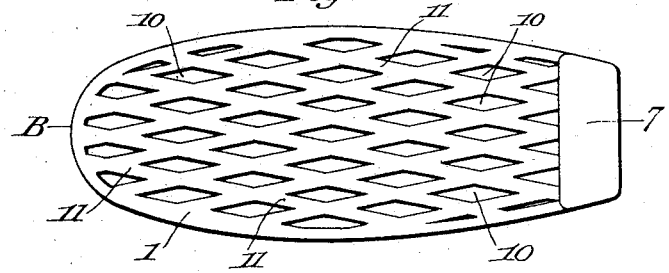
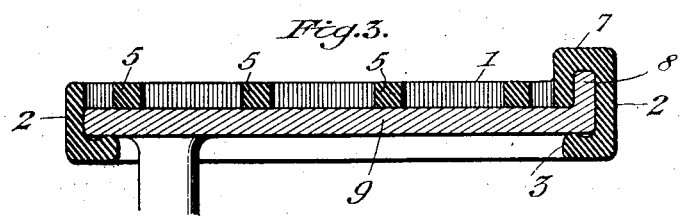
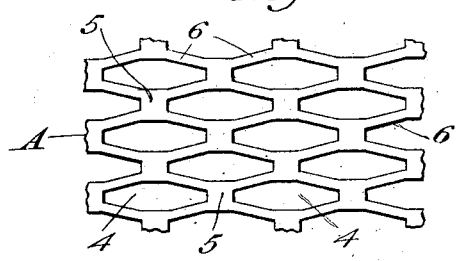
Inventor:
Frederick C. Grant,
By G. Sargent Elliott,
Attorney.

Patented Jan. 31, 1933

1,895,986

UNITED STATES PATENT OFFICE

FREDERICK C. GRANT, OF HARVEY, ILLINOIS

PEDAL PAD

Application filed October 12, 1931. Serial No. 568,307.

My invention relates to improvements in pedal pads for use in connection with the brake and clutch pedals of automobiles and like vehicles.

The primary object of the invention is to provide a rubber pad which is adapted for pedals of varying sizes and shapes, which is in the form of an integral structure having a mesh form of tread and requiring no separate or independent securing means, and which grips the pedal in such manner that accidental disconnection therefrom is practically impossible.

Further, to provide a rubber pad, the natural elasticity or stretching quality of which is augmented by forming the tread portion thereof with numerous rows of narrow slots or openings extending in a lengthwise direction, whereby the normal width of the pad can be materially increased without danger of tearing or splitting the same, said pad having a heavy, introverted, marginal lip on its under side for engaging the under side of a pedal, thereby to hold the pad thereon.

These objects are accomplished by the character of pad illustrated in the accompanying drawing, in which, Figure 1 is a plan view of a pad, the tread of which is formed with narrow, longitudinally disposed parallel lines of slots or openings.

Fig. 2 is a similar view, the slots or openings being arranged to produce a diagonal mesh-like arrangement.

Fig. 3 is a longitudinal sectional view of the improved pad shown in Fig. 1, secured upon a pedal; and Fig. 4 is a plan view of a portion of Figure 1 as it appears when stretched laterally.

Referring to the accompanying drawing:

The letters A and B refer, respectively, to rubber pads, each being substantially oval shaped and differing only in the arrangement of the openings in their treads or body portions, and each pad is of a size to fit snugly on the smallest oval pedal in use, though, as will be later shown, they may be applied to pedals other than of an oval shape. Each pad comprises a tread or body 1, and a marginal side member 2, at right angles to the tread, which terminates in an introverted lip 3; in the pad A, the tread is formed with parallel lines of narrow slots 4, which extend lengthwise of the pad, the slots in each line being separated or interrupted in end to end relation, by short walls or partitions 5, the partitions in the alternate lines of slots being in the same transverse line, and integral with the tread, the slots and the intervening parallel strips 6, which separate the lines of slots being substantially of the same width. By this arrangement, the partitions 5 in the alternate lines of slots are midway between the partitions 5 in the intervening lines of slots, so that when the pad is stretched in the direction of its width, the tread presents a series of elongated meshes, as shown in Fig. 4.

The outer end of the pad is formed with an upright foot stop 7, which is socketed on its under side to receive the corresponding foot stop 8, which is formed on the pedal 9, and while the pad is primarily intended for oval pedals, it may also be used on the smaller sized square or oblong pedals, as the slotted tread will permit the pad to be stretched to a much greater extent, in the direction of its width, than would otherwise be possible.

The short walls or partitions 5, which separate the slots 4 of each line of slots, form integral ties between each two parallel strips 6, whereby lateral stretching of the pad is communicated to the whole area of the tread, as each strip 6 is connected to the strip on each side of it, by several of the said partitions 5, thus providing a strong and durable tread or body having a greatly increased stretching quality over a solid tread.

In the pad B, the tread is formed with a plurality of elongated diamond shaped openings 10, the long diameters of which extend lengthwise of the pad. These openings 10 are arranged in transverse groups, those in one group alternating with those in the next succeeding group, the solid portions between the openings forming diagonal strips 11, which are integrally connected at their points of intersection. The whole tread is thus in the form of a plurality of meshes which permit the pad to be stretched to a much greater extent, in the direction of its width, than would be possible if the tread were solid.

While I have shown two ways of slotting the tread in order to increase its stretching quality in the direction of its width, it is apparent that other arrangements of the slots or openings would accomplish the same result. It would also be possible to get satisfactory results by extending the slots or openings half way from either side of the tread, instead of slotting its entire width, and the invention contemplates any arrangement of slots or openings that will materially increase the stretching quality of the pad.

Most automobile foot pedals in present use are substantially oval or are rounded at their ends, but are of no standard size, and therefore the improved pad, because of its increased stretching quality, will readily conform to the varying sizes and shapes of pedals when placed thereon, and the pull on the sides of the pad, even when the pad is stretched upon a large sized pedal, will not cause the introverted retaining lip to release its hold upon the under side of the pedal.

The pad is easily secured upon a pedal, will remain without danger of accidental disconnection, until it is worn out.

Having described my invention, what I claim as new and desire to secure by Letters Patent, is:

1. A rubber pedal pad of the character described, the tread portion of which is provided with a plurality of elongated lengthwise openings, said pad having integral pedal gripping members.

2. A rubber pedal pad of the character described, the tread portion of which is formed with rows of elongated openings extending longitudinally of the pad, and having an integral pedal gripping member.

3. A rubber pedal pad of the character described, having a tread portion formed with rows of elongated openings extending longitudinally of the pad, said tread having a marginal side member extending at right angles thereto, which terminates in an introverted lip.

4. A rubber pedal pad of the character described, having a tread portion formed with parallel rows of narrow elongated openings extending longitudinally of the pad, and having a marginal side member extending at right angles thereto, which terminates in an introverted lip.

5. A rubber pedal pad of the character described, which is substantially oval in contour, the tread portion of which is provided with parallel rows of narrow elongated openings extending longitudinally of the pad, and having a marginal member extending at right angles thereto, which terminates in an introverted lip, and a raised foot stop on one end of said pad.

6. The combination with a foot pedal, of a substantially oval rubber pad therefor, comprising a tread which rests upon the pedal, and a marginal portion which surrounds the edge of the pedal and terminates in an introverted lip which engages the under side of the pedal, thereby to secure the pad upon the pedal, said tread being formed with a plurality of rows of narrow elongated straight sided openings extending longitudinally of the pad, and with a foot stop on one end thereof.

7. The combination with a foot pedal having a foot stop on one end thereof, of a substantially oval rubber pad therefor, having a marginal portion which surrounds the edge of the pedal and terminates in an introverted lip which engages the under side of the pedal thereby to secure the pad to the pedal, a foot stop on the end of the pad having a socket to receive the corresponding stop on the pedal, the tread of said pad being formed with parallel rows of narrow elongated openings, the openings in each row extending longitudinally of the pad.

8. A rubber pad for foot pedals, which is substantially oval in contour, the tread portion of which is formed with a plurality of parallel rows of narrow elongated openings extending lengthwise of the pad and forming a mesh construction.

9. A pedal pad, comprising a cushion of rubber or the like, having a depending peripheral flange with an inwardly turned lip, adapted to encircle the edge of the pedal and to engage the underside thereof for retaining the pad in place, said cushion, exclusive of said flange and lip, having its continuity interrupted, whereby deformation thereof may be accomplished to conform said pad to variations in pedal sizes.

10. A pedal pad, comprising a cushion of rubber or the like, having a depending peripheral flange with inwardly turned lip adapted to encircle the edge of the pedal, and to engage the under side thereof to retain the pad in place, said cushion having a plurality of holes interrupting the central portion thereof, to permit deformation thereof for engagement with various sizes of pedals.

In testimony whereof, I affix my signature.

FREDERICK C. GRANT.